US009851701B2

(12) United States Patent
Hoppe

(10) Patent No.: US 9,851,701 B2
(45) Date of Patent: Dec. 26, 2017

(54) METHODS FOR OPTIMIZING AN ANALYSIS OF ENERGY CONSUMPTION TO REDUCE COST AND DEVICES THEREOF

(71) Applicant: Sabreez, LLC, Henrico, VA (US)

(72) Inventor: William Scott Hoppe, Henrico, VA (US)

(73) Assignee: Sabreez, LLC, Henrico, VA (US)

( * ) Notice: Subject to any disclaimer, the term of this patent is extended or adjusted under 35 U.S.C. 154(b) by 588 days.

(21) Appl. No.: 14/540,589

(22) Filed: Nov. 13, 2014

(65) Prior Publication Data

US 2015/0142195 A1    May 21, 2015

Related U.S. Application Data

(60) Provisional application No. 61/904,573, filed on Nov. 15, 2013.

(51) Int. Cl.
| | |
|---|---|
| *G05D 17/00* | (2006.01) |
| *G05B 15/00* | (2006.01) |
| *G05B 13/02* | (2006.01) |
| *H04L 29/08* | (2006.01) |

(Continued)

(52) U.S. Cl.
CPC ............ *G05B 15/00* (2013.01); *G05B 13/02* (2013.01); *G06Q 10/04* (2013.01); *G06Q 50/06* (2013.01); *H04L 67/10* (2013.01)

(58) Field of Classification Search
CPC .......... G06Q 10/06312; G06Q 30/0283; H02J 3/005; H02J 3/38; H02J 3/383; G05B 19/02; G05B 15/00; G05B 13/02
See application file for complete search history.

(56) References Cited

U.S. PATENT DOCUMENTS

| | | | |
|---|---|---|---|
| 2003/0009401 A1* | 1/2003 | Ellis | G06Q 30/0283 705/35 |
| 2010/0217550 A1* | 8/2010 | Crabtree | H02J 3/005 702/62 |

(Continued)

OTHER PUBLICATIONS

"Green Energy Performance Index (GEPI)", Use Green Energy, last accessed, Feb. 13, 2015, <http://usegreenenergy.today/>.

(Continued)

*Primary Examiner* — Tuan Vu
(74) *Attorney, Agent, or Firm* — LeClairRyan, a Professional Corporation

(57) ABSTRACT

A method, energy usage analysis device, and non-transitory computer readable medium that obtain an amount of energy generated from wind resources and thermal resources at a plurality of intervals over a specified time period. An amount of energy consumed by a user at each of the intervals is obtained. An energy source wind number value is generated for each of the intervals based on the respective amount of energy generated from the wind resources and the thermal resources. An energy consumption wind number value is generated for each of the intervals based on the respective energy source wind number value and the respective amount of energy consumed by the user. An overall wind number value is generated for the specified time period based on the energy consumption wind number values and the amount of energy consumed at each of the intervals. The overall wind number value is output.

18 Claims, 3 Drawing Sheets

(51) Int. Cl.
*G06Q 10/04* (2012.01)
*G06Q 50/06* (2012.01)

(56) References Cited

U.S. PATENT DOCUMENTS

| | | | | | |
|---|---|---|---|---|---|
| 2011/0082597 | A1* | 4/2011 | Meagher | ............ | H02J 3/38 |
| | | | | | 700/291 |
| 2012/0286723 | A1* | 11/2012 | Ukita | ............ | G06Q 10/06312 |
| | | | | | 320/107 |
| 2014/0039699 | A1* | 2/2014 | Forbes, Jr. | ............ | G05B 19/02 |
| | | | | | 700/286 |
| 2014/0163755 | A1* | 6/2014 | Potter | ............ | H02J 3/383 |
| | | | | | 700/287 |

OTHER PUBLICATIONS

"Get paid to improve your energy use." Ohm Connect, last accessed, Feb. 13, 2015, <https://www.ohmconnect.com/>.

* cited by examiner

300

| Date | Hour / Interval | Energy Source Wind Number Values 302 | | Energy Consumption Data 304 | Energy Consumption Wind Number Values 306 |
|---|---|---|---|---|---|
| | 1 | 41.5 | × | 0.8 | 31.1 |
| | 2 | 48.2 | × | 0.3 | 12.5 |
| | 3 | 58.2 | × | 0.3 | 14.6 |
| | 4 | 62.2 | × | 0.2 | 14.9 |
| | 5 | 56.3 | × | 0.2 | 11.3 |
| | 6 | 45.3 | × | 0.2 | 8.2 |
| | 7 | 42.0 | × | 0.3 | 11.3 |
| | 8 | 33.0 | × | 1.2 | 38.3 |
| | 9 | 22.5 | × | 2.3 | 50.9 |
| | 10 | 15.8 | × | 2.2 | 34.6 |
| | 11 | 11.3 | × | 0.9 | 9.7 |
| | 12 | 6.0 | × | 0.8 | 4.9 |
| | 13 | 5.x | × | 1.2 | 6.6 |
| | 14 | 10.x | × | 0.8 | 7.7 |
| | 15 | 15.2 | × | 0.4 | 6.4 |
| | 16 | 23.6 | × | 0.3 | 7.8 |
| | 17 | 34.9 | × | 0.8 | 27.6 |
| | 18 | 37.6 | × | 1.2 | 44.0 |
| | 19 | 37.8 | × | 0.8 | 29.0 |
| | 20 | 38.3 | × | 2.4 | 90.0 |
| | 21 | 41.1 | × | 1.1 | 44.4 |
| | 22 | 21.9 | × | 3.5 | 75.8 |
| | 23 | 25.6 | × | 2.8 | 70.4 |
| | 24 | 29.1 | × | 2.1 | 59.7 |
| | | | | 26.5 | 711.4 |

Sum                711.4  =  Overall Wind Number Value 308
Sum Hourly Wind Number   26.8
Sum Usage for Period     26.5

METHODS FOR OPTIMIZING AN ANALYSIS OF ENERGY CONSUMPTION TO REDUCE COST AND DEVICES THEREOF

This application claims the benefit of U.S. Provisional Patent Application No. 61/904,573, filed on Nov. 15, 2013, which is hereby incorporated by reference in its entirety.

FIELD

This technology relates to methods and devices for optimizing an analysis of energy consumption to reduce cost.

BACKGROUND

Energy costs are a significant and generally increasing portion of a typical energy consumer's budget. While reducing overall consumption can reduce energy cost for an energy consumer, efforts to reduce overall consumption can be challenging and opportunities for reducing energy consumption may not be readily available or practical.

Energy sources generally include thermal sources including fossil fuel burning power plants, such as natural gas turbine and coal power plants for example, as well as renewable sources including renewable energy power plants, such as wind and solar power plants, for example. Generally, fossil fuel burning power plants are the primary source of energy used by energy providers to balance with the available supply of renewable energy to meet consumer demand.

Wind power production and utility rates are generally inversely correlated, such that wind is often strongest when rates are lowest, particularly in markets with a time of use rate tariff. Accordingly, utility rates are relatively low when wind power production is peaking on a daily basis. Since utility rates are relatively low when an increased percentage of the energy provided to a consumer is generated by wind power, consumers can reduce energy costs, without reducing overall energy consumption, by increasing the portion of consumed energy that is generated by wind power as compared to thermal sources. Additionally, there are significant environmental benefits to encouraging and increasing consumption of energy generated by wind power and other renewable energy sources. However, there is currently no effective way to analyze the relative amount of energy consumed by an energy consumer that is generated by wind power to allow the energy consumer to take more informed measures to reduce energy costs.

SUMMARY

A method for optimizing an analysis of energy consumption includes obtaining, by an energy usage analysis device, energy source data comprising at least an amount of energy generated from one or more wind resources and one or more thermal resources at each of a plurality of intervals over a specified time period. An amount of energy consumed by a user at each of the intervals over the specified time period is obtained by the energy usage analysis device. An energy source wind number value is generated, by the energy usage analysis device, for each of the intervals based on the respective amount of energy generated from the wind resources and the thermal resources. An energy consumption wind number value is generated, by the energy usage analysis device, for each of the intervals based on the respective energy source wind number value and the respective amount of energy consumed by the user. An overall wind number value for the specified time period is generated, by the energy usage analysis device, based on the energy consumption wind number values and the amount of energy consumed by the user at each of the intervals over the specified time period. The overall wind number value is output by the energy usage analysis device.

An energy usage analysis device including a processor and a memory coupled to the processor which is configured to be capable of executing programmed instructions comprising and stored in the memory to obtain energy source data comprising at least an amount of energy generated from one or more wind resources and one or more thermal resources at each of a plurality of intervals over a specified time period. An amount of energy consumed by a user at each of the intervals over the specified time period is obtained. An energy source wind number value is generated for each of the intervals based on the respective amount of energy generated from the wind resources and the thermal resources. An energy consumption wind number value is generated for each of the intervals based on the respective energy source wind number value and the respective amount of energy consumed by the user. An overall wind number value for the specified time period is generated based on the energy consumption wind number values and the amount of energy consumed by the user at each of the intervals over the specified time period. The overall wind number value is output.

A non-transitory computer readable medium having stored thereon instructions for optimizing an analysis of energy consumption comprising executable code which when executed by a processor, causes the processor to perform steps including obtaining energy source data comprising at least an amount of energy generated from one or more wind resources and one or more thermal resources at each of a plurality of intervals over a specified time period. An amount of energy consumed by a user at each of the intervals over the specified time period is obtained. An energy source wind number value is generated for each of the intervals based on the respective amount of energy generated from the wind resources and the thermal resources. An energy consumption wind number value is generated for each of the intervals based on the respective energy source wind number value and the respective amount of energy consumed by the user. An overall wind number value for the specified time period is generated based on the energy consumption wind number values and the amount of energy consumed by the user at each of the intervals over the specified time period. The overall wind number value is output.

With this technology, energy consumers can be more effectively informed regarding the proportion of their consumed energy generated by wind power. In particular, energy consumers can advantageously determine how their consumption of wind energy has changed over time and/or how their consumption of wind energy compares to other energy consumers sharing characteristic(s). Accordingly, with the information provided by this technology, users can take measures to increase the proportion of consumed energy generated by wind power, resulting in a corresponding reduction in energy cost.

BRIEF DESCRIPTION OF THE DRAWINGS

FIG. 3 is an exemplary table including energy source wind numbers values, energy consumption data, energy consumption wind number values, and an overall wind number value for an exemplary energy consumer user.

DETAILED DESCRIPTION

Figure 1:
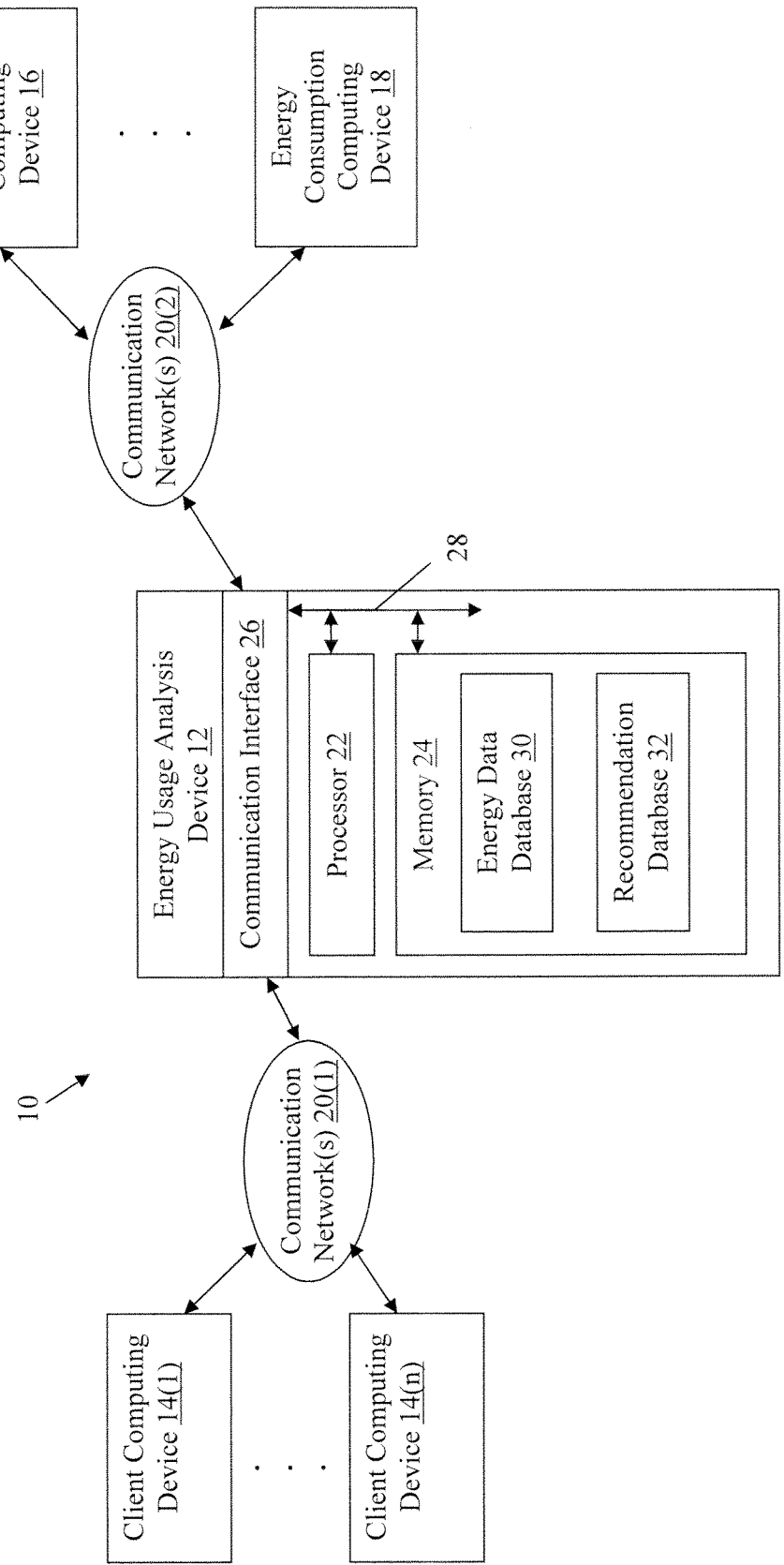
FIG. 1 is a block diagram of an network environment with an exemplary energy usage analysis device.

An exemplary network environment 10 with an energy usage analysis device 12 coupled to client computing devices 14(1)-14(n), an energy source computing device 16, and an energy consumption computing device 18 by one or more communication network(s) 20(1)-20(n) is illustrated in FIG. 1, although this network environment 10 can include other numbers and types of systems, devices, and elements in other configurations. While not shown, the network environment 10 also may include additional network components such as routers and switches which are well known to those of ordinary skill in the art and thus will not be described here. This technology provides a number of advantages including methods, non-transitory computer readable media, and devices that facilitate more effective analysis of energy consumption based on the amount of wind energy consumed by an energy consumer to facilitate energy cost reductions for the energy consumer.

The energy usage analysis device 12 includes a processor 22, a memory 24, and a communication interface 26, which are coupled together by a bus 28 or other communication link, although other numbers and types of systems, devices, components, and elements in other configurations and locations can also be used. The processor 22 in the energy usage analysis device 12 executes a program of stored instructions for one or more aspects of the present technology, as described and illustrated by way of the examples herein, although other types and numbers of processing devices and configurable hardware logic could be used and the processor could execute other numbers and types of programmed instructions.

The memory 24 in the energy usage analysis device 12 stores these programmed instructions for one or more aspects of the present technology as described and illustrated herein, although some or all of the programmed instructions could be stored and executed elsewhere. A variety of different types of memory storage devices, such as a RAM, ROM, hard disk, or other computer readable medium which is read from and written to by a magnetic, optical, or other reading and writing system that is coupled to the processor 22, can be used for the memory 24.

In this example, the memory 24 includes an energy data database 30 which is a repository for overall wind number values and energy consumer attributes, as described and illustrated in more detail later. Additionally, the memory 24 in this example includes a recommendation database which stores recommendations regarding energy consumption that can be provided to a user based on the user's overall wind number, also as described and illustrated in more detail later. In other examples, the memory 24 can store other information in other formats and the information stored in the energy data database 30 and/or recommendation database 32 can be stored elsewhere.

The communication interface 26 in the energy usage analysis device 12 is used to operatively couple and communicate between the energy usage analysis device 12, the client computing devices 14(1)-14(n), the energy source computing device 16, and the energy consumption computing device 18 via the communication network(s) 20(1) and 20(2), although other types and numbers of connections and configurations can also be used. By way of example only, the communication network(s) 20(1) and 20(2)can include one or more local area networks or wide area networks, for example, and can use TCP/IP over Ethernet and industry-standard protocols, including hypertext transfer protocol (HTTP) and secure HTTP (HTTPS), although other types and numbers of communication networks, such as a direct connection, modems and phone lines, e-mail, and wireless and hardwire communication technology, each having their own communications protocols, can also be used.

The client computing devices 14(1)-14(n) in this example each include a processor, a memory, a communication interface, an input device, and a display device, which are coupled together by a bus or other communication link. The client computing devices 14(1)-14(n) can also have other numbers and types of systems, devices, components, and elements in other configurations and locations. The client computing devices 14(1)-14(n) can by way of example only be mobile computing devices, smartphones, tablets, laptops, desktop computers, or any combination thereof. In some examples, energy consumers, for example, can use the client computing devices 14(1)-14(n) to interface with the energy usage analysis device 12 to request energy consumption data and overall wind number values, as described and illustrated in more detail later.

The energy source computing device 16 in this example includes a processor, a memory, and a communication interface, which are coupled together by a bus or other communication link. The energy source computing device 16 also can have other numbers and types of systems, devices, components, and elements in other configurations and locations. The energy source computing device 16 can for example be a server computing device or other data storage device associated with and/or maintained by a grid operator and configured to provide energy source data for specified time periods upon request, as described and illustrated for example herein.

The energy consumption computing device 18 in this example includes a processor, a memory, and a communication interface, which are coupled together by a bus or other communication link. The energy consumption computing device 18 also can have other numbers and types of systems, devices, components, and elements in other configurations and locations. The energy consumption computing device 18 can be a server computing device or other data storage device associated with and/or maintained by an energy utility or other energy provider, for example, and configured to provide energy consumption data for a user for specified time periods upon request, as described and illustrated in more detail later.

Although examples of the energy usage analysis device 12, client computing devices 14(1)-14(n), energy source computing device 16, and energy consumption computing device 18, which are coupled together via the communication network(s) 20(1) and 20(2) are described herein, each of these systems can be implemented on any suitable computer system or other computing device. It is to be understood that the devices and systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems in any embodiment of the examples. The examples may also be implemented on computer device(s) that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, or combinations thereof.

The examples may also be embodied as a non-transitory computer readable medium having programmed instructions stored thereon for one or more aspects of the present technology as described and illustrated by way of the examples herein. The programmed instructions, when executed by a processor, cause the processor to carry out the steps necessary to implement one or more methods of the examples, as described and illustrated herein.

Figure 2:
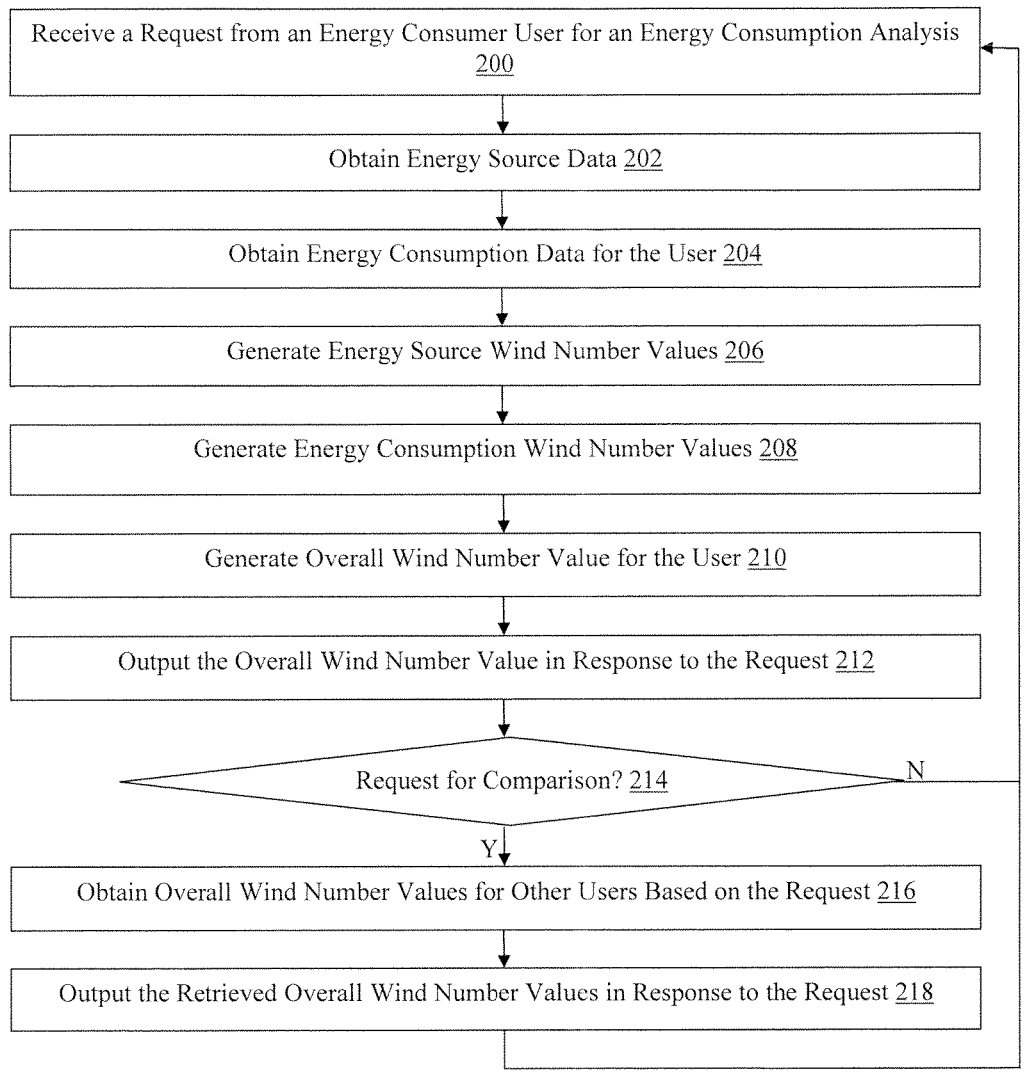
FIG. 2 is a flowchart of an exemplary method for optimizing an analysis of energy consumption.

Exemplary methods for optimizing an analysis of energy consumption s will now be described with reference to FIGS. 1-3. Referring more specifically to FIG. 2, in step 200 the energy usage analysis device 12 receives a request from an energy consumer user via one of the client computing devices 14(1)-14(n) for an energy consumption analysis. In this example, the request includes information associated with the user, such as the user's name, home address information, unique smart meter identifier, unique energy utility account number, or any other identifying information that can be used to obtain energy consumption data, as described and illustrated in more detail with reference to step 204. Additionally, the request in this example includes a specified time period, such as one billing period or a specified date or date range of energy consumption, for example, although other specified time periods can also be included in the request. Optionally, the request and/or information associated with the user is submitted by the user of the one of the client computing devices 14(1)-14(n) via a web page or other graphical user interface provided by the energy usage analysis device 14, although other manners of facilitating the communication of the energy consumption analysis request and/or information associated with the user can also be used.

In step 202, the energy usage analysis device 12 obtains energy source data from the energy source computing device 16 associated with a grid operator based on the information associated with the user included in the request received in step 200. The energy source data can be obtained by the energy usage analysis device 12 via a web page or other graphical user interface provided by the energy source computing device 16, for example. Accordingly, in this example, the energy usage analysis device 12 identifies the grid operator and associated energy source computing device 16 based on the information associated with the user, although other manners for obtaining the energy source data can be used. The obtained energy source data includes at least an amount of energy generated from each of one or more wind resources and one or more thermal resources for each of a plurality of intervals over the time period specified in the request in this example, although the energy source data can include other information. For example, the respective amounts of energy can be obtained in hourly intervals for a date specified in the request, although other intervals and time periods also can be used.

Optionally, the obtained energy source data can be stored in the energy data database 30 as associated with the grid operator and the specified time period, for example. Also optionally, previously obtained energy source data can be retrieved from the energy data database 30 in step 202. Accordingly, the energy usage analysis device 12 can query the energy data database 30 for the energy source data based on the information associated with the user, the specified time period, and the identified grid operator for the user, to determine whether the energy source data is available from the energy data database 30. If the energy usage analysis device 12 determines the energy source data is available from the energy data database 30, then the energy source data can be retrieved from the energy data database 30 in step 202 rather than obtained from energy source computing device 16.

In step 204, the energy usage analysis device 12 obtains an amount of energy consumed by the user of the one of the client computing devices 14(1)-14(n) that submitted the request received in step 200. The energy consumption data can be obtained by the energy usage analysis device 12 from the energy consumption computing device 18 which is associated with an energy utility identified based on the information associated with the user included in the request received in step 200, for example, although other manners of identifying the energy utility and/or energy consumption computing device 18 can also be used. In this example, the amount of energy consumed by the user is obtained for the intervals of the time period specified in the request received in step 200 and used to obtain the energy source data in the step 202, although the energy consumer by the user can be obtained for other time periods and other manners for obtaining the energy consumption data can also be used.

Optionally, the amount of energy consumed by the user can be obtained using an application programming interface (API) that facilitates access to the energy consumption amounts maintained by the identified utility and obtained in step 204. One example of such an API is the Green Button Connect API offered by Tendril Inc., although any other API can also be used. The utility can obtain the energy consumption data from a smart meter associated with the user, for example, although any other method of obtaining the energy consumption data retrieved from the energy consumption computing device 18 can be used.

In another example, the energy usage analysis device 12 can obtain the energy consumption data directly from a network-connected smart meter associated with the user of the one of the client computing devices 14(1)-14(n). The smart meter can be identified and/or located based on the information associated with the user submitted with the request in step 200, for example, although other methods of communicating directly with a smart meter associated with the user can also be used. In yet another example, the energy usage analysis device 12 can obtain the energy consumption data from the user of the one of the client computing devices 14(1)-14(n) via a provided web page or other graphical user interface, for example. In this example, the user can use one of the client computing devices 14(1)-14(n) to communicate with a network-connected smart meter associated with the user to obtain the energy consumption data. Other methods of obtaining the amount of energy consumed by the user for the intervals of the specified time period also can be used.

In step 206, the energy usage analysis device 12 generates an energy source wind number value based on the respective amount of energy generated from the wind resources and the thermal resources for each of the intervals of the specified time period, as determined based on the energy source data obtained in step 202. In this example, the energy source wind number values for each of the intervals of the specified time period are generated based on a ratio of the amount of energy generated from wind sources and the amount of energy generated from thermal sources. Optionally, the ratio can be multiplied by one hundred to generate the energy source wind number values, although any other constant can also be used. Also optionally, the generated energy source wind number values can be stored in the memory 24 of the energy usage analysis device 12 as associated with the respective interval.

In step 208, the energy usage analysis device 12 generates energy consumption wind number values based on the respective energy source wind number value and the respective amount of energy consumed by the user for each of the intervals of the specified time period. The energy source wind number values for each of the intervals are generated in step 206 and the energy consumed by the user for each of the intervals is obtained in step 204, as described and illustrated earlier. In this example, the energy consumption wind number values are generated for each of the intervals of the specified time period based on a product of the respective energy source wind number values and the respective amount of energy consumed by the user. Optionally, the generated energy consumption wind number values can be stored in the memory 24 of the energy usage analysis device 12 as associated with the respective interval.

In step 210, the energy usage analysis device 12 generates an overall wind number value for the specified time period. In this example, the overall wind number value is generated based on the energy consumption wind number values generated in step 208 and the amount of energy consumed by the user at each of the intervals over the specified time period, as obtained in step 204, as described and illustrated earlier. More specifically, the overall wind number value is further generated in this example based on a ratio of a sum of the energy consumption wind number values and a sum of the energy consumed by the user at each of the intervals over the specified time period.

In step 212, the energy usage analysis device 12 outputs the generated overall wind number value to the one of the client computing devices 14(1)-14(n) in response to the request received in step 200. Optionally, the overall wind number value for the user can be output to a web page or other graphical user interface generated by the energy usage analysis device 12 and provided to the one of the client computing devices 14(1)-14(n) over the communication network(1) 20(1), although other methods of outputting the overall wind number value can also be used. Optionally, the energy usage analysis device 12 can store the overall wind number value as associated with at least a portion of the information associated with the user in the energy data database 30, for example.

Optionally, in step 212, the energy usage analysis device 12 can also query the energy data database 30 to determine whether any previously generated overall wind number values associated with the user are stored in the energy data database 30. If other overall wind number values are stored in the energy data database 30, the energy usage analysis device 12 can optionally output at least a subset of the other overall wind number values, and optionally identifying information such as the date and/or time period, along with the overall wind number value generated in step 210 to provide the user of the one of the client computing devices 14(1)-14(n) with a historical comparison. Accordingly, in this example, the user of the one of the client computing devices 14(1)-14(n) can advantageously utilize analytics to determine how their energy usage is changing over time with respect to the proportion of their energy consumption associated with wind power.

Also optionally, the energy usage analysis device 12 can output recommendation(s) for increasing the proportion of the energy consumed by the user that is generated by wind power. The recommendations can relate to suggested ways to reduce consumption at various times of the day, such as by shifting or scheduling consumption for certain devices or appliances to evening, night, or early morning hours, for example, although any other type of recommendation can also be used. The recommendation(s) can be retrieved from the recommendation database 32 stored in the memory 24 of the energy usage analysis device 12, for example.

In this example, the recommendation(s) can be default recommendations or recommendations specifically identified and correlated based on the information associated with the user received in step 200 and/or the energy consumption data obtained in step 204, for example. The retrieved recommendation(s) can be provided by the energy usage analysis device 12 to the one of the client computing devices 14(1)-14(n) via a web page or other graphical user interface, for example, although other types and numbers of recommendation(s) can be obtained and the recommendation(s) can be provided in other manners.

Accordingly, in this example, the user of the one of the client computing devices 14(1)-14(n) can optionally determine, using the historical overall wind numbers optionally output in step 212, how the proportion of consumed energy generated from wind power has been impacted by implementing one or more recommendation(s) or other practices. In another example, additional analytics can be executed and output to illustrate how recommended shifts in behavior and/or consumption could result in an increased wind number and associated reduced energy cost.

While comparison of the overall wind number generated in step 210 to historical overall wind number values may be useful for determining progress toward a goal of increased wind energy consumption and associated reduced energy cost, in some examples, the user can also request and receive comparison information for other energy consumers, such as those sharing one or more characteristics with the user of the one of the client computing devices 14(1)-14(n), as described and illustrated with reference to optional steps 214-218. In these examples, in step 214, the energy usage analysis device 12 determines whether a request for such an energy analysis comparison is received from the user of the one of the client computing devices 14(1)-14(n). The request can be received via a web page or other graphical user interface provided by the energy usage analysis device 12, for example, although the request can be received in other manners.

If the energy analysis computing device 12 determines that a request for such an energy analysis comparison is not received, then the No branch is taken back to step 200 and the energy usage analysis device 12 may receive another request from the same user for a different time period or from a different user of another of the client computing devices 14(1)-14(n), for example.

However, if the energy usage analysis device 12 determines in step 214 that a request for an energy analysis comparison is received, then the Yes branch is taken to step 216. In step 216, the energy usage analysis device 12 obtains overall wind number values for one or more other users of one or more of the client computing devices 14(1)-14(n). In this example, the request includes one or more energy consumer attributes used to retrieve the other overall wind number values. For example, the user can request a comparison for overall wind number values for other residents of the same street as the user's residence, in the same geographic area, and/or with a similar size home, for example, although any other energy consumer attributes can also be used.

With the energy consumer attributes, the energy usage analysis device 12 can query the energy data database 30 for overall wind number values for users matching the energy consumer attributes, as previously generated and stored as described and illustrated earlier with reference to steps 200-210. Alternatively, the energy usage analysis device 12 can query the energy source computing device 16 and/or energy consumption computing device 18 over the communication network(s) 20(2), based on the energy consumer attributes, to obtain relevant energy source and energy consumption data that can be used to generate overall wind number values for other energy consumers, as described and illustrated earlier with reference to steps 204-210. Other methods of obtaining overall wind numbers for other energy consumers based on the request received in step 214 can also be used.

In step 218, the energy usage analysis device 12 outputs the overall wind number values obtained in step 216 to the user of the one of the client computing devices 14(1)-14(n) in response to the request. Optionally, the obtained overall wind number values can be output to a web page or other graphical user interface generated by the energy usage analysis device 12 and provided to the one of the client computing devices 14(1)-14(n) over the communication network(s) 20(1), although other methods of outputting the overall wind number values can also be used. Also optionally, personally identifiable information of the other energy consumers can be filtered and restricted from being output in step 218.

Accordingly, with the obtained overall wind number values, the user of the one of the client computing devices 14(1)-14(n) is provided with results illustrating whether the energy consumed by the user generated from wind power is a relatively higher or lower proportion of the total consumer energy as compared to that of other energy consumers sharing one or more characteristics with the user, for example. Thereby, the user may be incentivized to change energy consumption behavior and/or shift consumption to time periods when a greater proportion of the energy provided to the user is generated from wind power, for example.

Referring more specifically to FIG. 3, an exemplary table 300 including energy source wind numbers values 302, energy consumption data 304, energy consumption wind number values 306, and an overall wind number value 308 for an exemplary energy consumer user is illustrated. In this example, the time period is one day and the intervals are each one hour, although another time period and/or interval could be used in other examples. The energy source wind number values 302 are generated in this example by the energy usage analysis device 12, as described and illustrated earlier with reference to step 206 based on energy source data obtained in step 202 and a constant value of one hundred. Accordingly, the energy source wind number values 302 represent a percentage of the total amount of energy provided to the user at each of the intervals that was generated from wind power.

In this example, the energy consumption data 304 is obtained by the energy usage analysis device 12 for the user over the one day time period, as described and illustrated earlier with reference to step 204. With the energy source wind number values 302 and the energy consumption data 304, the energy usage analysis device 12 generates the energy consumption wind number values 306, as described and illustrated earlier with reference to step 208. In this example, the overall wind number value 308 of 26.8 is generated by the energy usage analysis device 12, as described and illustrated earlier with reference to step 210. Accordingly, the overall wind number value 308 is representative of the exemplary user's proportion of consumed energy generated by wind power over the one day time period of this example. As described and illustrated in more detail earlier, the overall wind number value can be provided to the user through a web page or other graphical user interface.

Accordingly, this technology provides an improvement in energy consumption analysis technology whereby energy consumers can be more effectively informed regarding the proportion of their consumed energy generated by wind power for a specified time period. With this technology, users can advantageously determine how their consumption of wind energy has changed over time and/or how their consumption of wind energy compares to other energy consumers sharing one or more characteristics. Accordingly, with the information provided by this technology, users can take measures to increase the proportion of consumed energy generated by wind power, resulting in a corresponding reduction in energy cost.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing an analysis of energy consumption, the method programmed with memory-stored instructions coupled to a processor included with an energy usage analysis device, the analysis device directing execution of the instructions by the processor to perform the method, comprising:
  obtaining, by the energy usage analysis device, energy source data comprising at least an amount of energy generated from one or more wind resources and one or more thermal resources at each of a plurality of intervals over a specified time period;
  obtaining, by the energy usage analysis device, an amount of energy consumed by a user at each of the intervals over the specified time period;
  generating, by the energy usage analysis device, for each of the intervals, an energy source wind number value based on a ratio of the respective amount of energy generated from the wind resources and the thermal resources;
  generating, by the energy usage analysis device, for each of the intervals, an energy consumption wind number value based on a product of the respective energy source wind number value and the respective amount of energy consumed by the user;
  generating, by the energy usage analysis device, an overall wind number value for the specified time period based on a ratio of a sum the energy consumption wind number values and a sum of the amount of energy consumed by the user at each of the intervals over the specified time period; and
  outputting, by the energy usage analysis device, the overall wind number value.

2. The method of claim 1, wherein the amount of energy consumed by the user is obtained using an application programming interface from a utility from which the user obtains energy.

3. The method of claim 1, wherein the outputting further comprises outputting a comparison of a historical overall wind number value previously generated for the user for a period of time corresponding to the specified time period.

4. The method of claim 1, wherein the specified time period is one billing period.

5. The method of claim 1, further comprising:
receiving, by the energy usage analysis device, a request from the user for an energy consumption analysis, the request comprising information associated with the user, wherein the amount of energy consumed by the user is obtained using the information associated with the user; and
storing, by the energy usage analysis device, the overall wind number value as associated with at least a portion of the information associated with the user.

6. The method of claim 1, further comprising:
receiving, by the energy usage analysis device, a request from the user for an energy analysis comparison, the request comprising one or more energy consumer attributes;
obtaining, by the energy usage analysis device, one or more other overall wind numbers each associated with another user based on the energy consumer attributes; and
outputting, by the energy usage analysis device, the other overall wind numbers in response to the request.

7. An energy usage analysis device, comprising memory comprising programmed instructions stored thereon, the memory coupled to a processor, which is configured to be capable of executing the stored programmed instructions to:
obtain energy source data comprising at least an amount of energy generated from one or more wind resources and one or more thermal resources at each of a plurality of intervals over a specified time period;
obtain an amount of energy consumed by a user at each of the intervals over the specified time period;
generate for each of the intervals, an energy source wind number value based on a ratio of the respective amount of energy generated from the wind resources and the thermal resources;
generate for each of the intervals, an energy consumption wind number value based on a product of the respective energy source wind number value and the respective amount of energy consumed by the user;
generate an overall wind number value for the specified time period based on a ratio of a sum of the energy consumption wind number values and a sum of the amount of energy consumed by the user at each of the intervals over the specified time period; and
output the overall wind number value.

8. The energy usage analysis device of claim 7, wherein the amount of energy consumed by the user is obtained using an application programming interface from a utility from which the user obtains energy.

9. The energy usage analysis device of claim 7, wherein the processor coupled to the memory is further configured to be capable of executing the stored programmed instructions to output a comparison of a historical overall wind number value previously generated for the user for a period of time corresponding to the specified time period.

10. The energy usage analysis device of claim 7, wherein the specified time period is one billing period.

11. The energy usage analysis device of claim 7, wherein the processor coupled to the memory is further configured to be capable of executing the stored programmed instructions to:
receive a request from the user for an energy consumption analysis, the request comprising information associated with the user, wherein the amount of energy consumed by the user is obtained using the information associated with the user; and
store the overall wind number value as associated with at least a portion of the information associated with the user.

12. The energy usage analysis device of claim 7, wherein the processor coupled to the memory is further configured to be capable of executing the stored programmed instructions to:
receive a request from the user for an energy analysis comparison, the request comprising one or more energy consumer attributes;
obtain one or more other overall wind numbers each associated with another user based on the one or more energy consumer attributes; and
output the other overall wind numbers in response to the request.

13. A non-transitory computer readable medium having stored thereon instructions for optimizing an analysis of energy consumption comprising executable code which when executed by a processor, causes the processor to:
obtain energy source data comprising at least an amount of energy generated from one or more wind resources and one or more thermal resources at each of a plurality of intervals over a specified time period;
obtain an amount of energy consumed by a user at each of the intervals over the specified time period;
generate for each of the intervals, an energy source wind number value based on a ratio of the respective amount of energy generated from the wind resources and the thermal resources;
generate, for each of the intervals, an energy consumption wind number value based on a product of the respective energy source wind number value and the respective amount of energy consumed by the user;
generate an overall wind number value for the specified time period based on a ratio of a sum of the energy consumption wind number values and a sum of the amount of energy consumed by the user at each of the intervals over the specified time period; and
output the overall wind number value.

14. The non-transitory computer readable medium of claim 13, wherein the amount of energy consumed by the user is obtained using an application programming interface from a utility from which the user obtains energy.

15. The non-transitory computer readable medium of claim 13, wherein the executable code when executed by the processor further causes the processor to output a comparison of a historical overall wind number value previously generated for the user for a period of time corresponding to the specified time period.

16. The non-transitory computer readable medium of claim 13, wherein the specified time period is one billing period.

17. The non-transitory computer readable medium of claim 13, wherein the executable code when executed by the processor further causes the processor to:
receive a request from the user for an energy consumption analysis, the request comprising information associated with the user, wherein the amount of energy consumed by the user is obtained using the information associated with the user; and store the overall wind number value as associated with at least a portion of the information associated with the user.

18. The non-transitory computer readable medium of claim 13, wherein the executable code when executed by the processor further causes the processor to:

receive a request from the user for an energy analysis comparison, the request comprising one or more energy consumer attributes;

obtain one or more other overall wind numbers each associated with another user based on the one or more energy consumer attributes; and output the other overall wind numbers in response to the request.

* * * * *